US011992937B2

(12) United States Patent
Cisi et al.

(10) Patent No.: US 11,992,937 B2
(45) Date of Patent: May 28, 2024

(54) GRIPPING TOOL USABLE ON A MANIPULATOR DEVICE

(71) Applicant: C.R.F. Società Consortile per Azioni, Orbassano (IT)

(72) Inventors: Alessandro Cisi, Orbassano (IT); Giorgio Pasquettaz, Orbassano (IT); Giovanni Campobasso, Turin (IT); Massimo Martorelli, Naples (IT); Claudio Marcello, Naples (IT); Giuseppe Perrotta, Naples (IT)

(73) Assignee: C.R.F. Società Consortile per Azioni, Orbassano Torino (IT)

( * ) Notice: Subject to any disclaimer, the term of this patent is extended or adjusted under 35 U.S.C. 154(b) by 248 days.

(21) Appl. No.: 17/552,452

(22) Filed: Dec. 16, 2021

(65) Prior Publication Data
US 2022/0193923 A1    Jun. 23, 2022

(30) Foreign Application Priority Data

Dec. 17, 2020 (EP) ................................. 20214844

(51) Int. Cl.
*B25J 15/00* (2006.01)
*B25J 19/00* (2006.01)

(52) U.S. Cl.
CPC ......... *B25J 15/0061* (2013.01); *B25J 19/007* (2013.01)

(58) Field of Classification Search
CPC ............................ B25J 15/0061; B25J 19/007
USPC ................................................ 294/213, 81.6
See application file for complete search history.

(56) References Cited

U.S. PATENT DOCUMENTS

| 8,485,575 | B2* | 7/2013 | Yeum | B25J 15/0052 |
| | | | | 294/81.2 |
| 8,908,933 | B2* | 12/2014 | Shah | G06V 40/174 |
| | | | | 382/118 |
| 9,808,933 | B2* | 11/2017 | Lin | B25J 15/0616 |
| 10,112,666 | B2* | 10/2018 | Shi | B25J 15/0061 |
| 2006/0181092 | A1* | 8/2006 | Kikut | B25J 15/0061 |
| | | | | 294/2 |
| 2006/0291951 | A1 | 12/2006 | Zile et al. | |
| 2007/0006462 | A1* | 1/2007 | Van Zile, III | B25J 15/0052 |
| | | | | 29/897.2 |
| 2008/0226427 | A1* | 9/2008 | Van Zile | B25J 15/0061 |
| | | | | 414/800 |

(Continued)

FOREIGN PATENT DOCUMENTS

| DE | 102016108956 A1 | 11/2017 |
| EP | 3106678 A1 | 12/2016 |
| WO | 2015181772 A1 | 12/2015 |

OTHER PUBLICATIONS

European Search Report dated Jun. 11, 2021. 3 pages.

*Primary Examiner* — Paul T Chin
(74) *Attorney, Agent, or Firm* — RMCK Law Group PLC

(57) ABSTRACT

A gripping tool, usable on a manipulator device for picking up and handling items includes a support frame extending along a first axis, provided with an attachment element for connecting to the manipulator device; and a plurality of gripping devices distributed in assemblies. Each assembly is carried by a respective auxiliary frame connected to the support frame by means of respective connecting members configured to be able to adjust the auxiliary frames and the gripping devices in position with respect to the support frame.

10 Claims, 6 Drawing Sheets

(56) References Cited

U.S. PATENT DOCUMENTS

| | | | |
|---|---|---|---|
| 2011/0133501 A1* | 6/2011 | Yeum | B25J 15/0061 |
| | | | 294/81.2 |
| 2020/0070363 A1 | 3/2020 | Tresse | |
| 2022/0033020 A1* | 2/2022 | Yokote | B62D 65/06 |

* cited by examiner

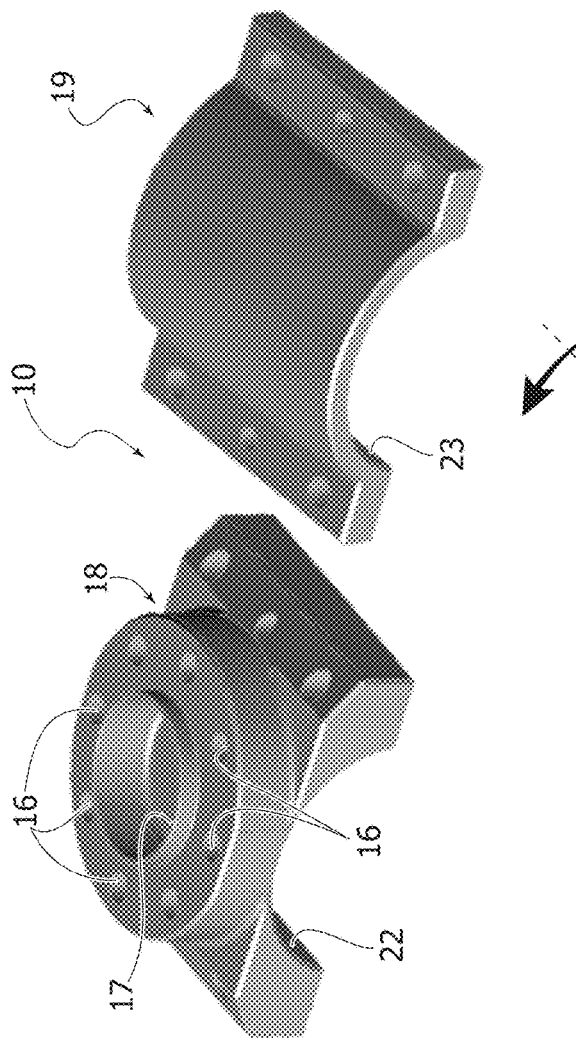
FIG. 3A
FIG. 3B
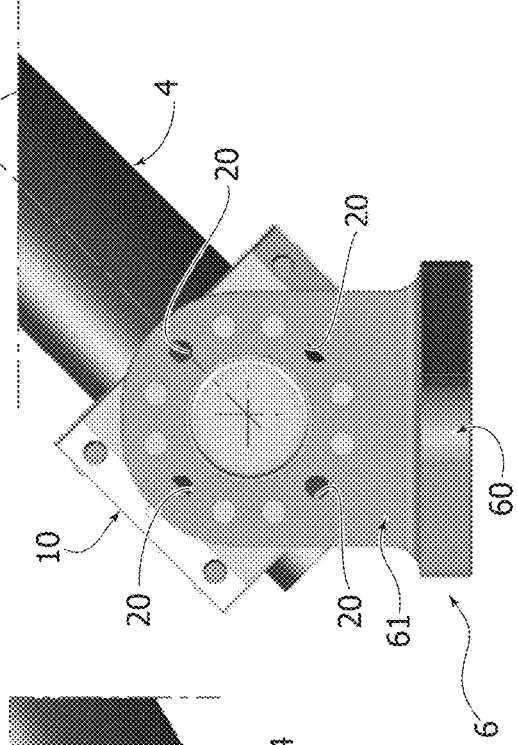
FIG. 4A
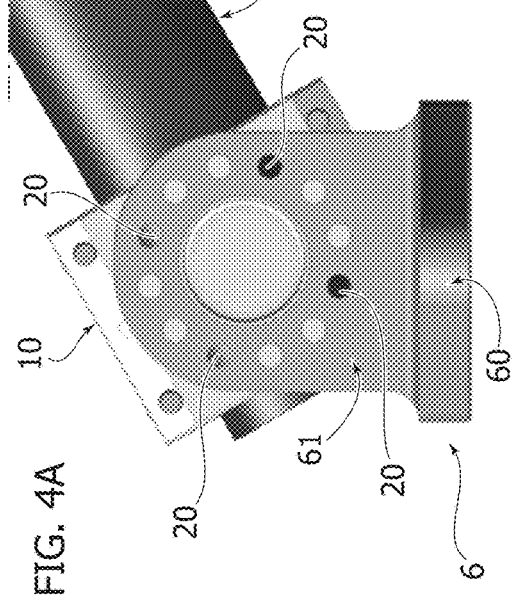
FIG. 4B

GRIPPING TOOL USABLE ON A MANIPULATOR DEVICE

CROSS-REFERENCE TO RELATED APPLICATION

This application claims priority to European Patent Application No, 20214844.1 filed on Dec. 17, 2020. The disclosure of the above application is incorporated herein by reference in its entirety.

FIELD OF THE INVENTION AND PRIOR ART

The present invention relates to a gripping tool, which can be used by a manipulator device to pick up and manipulate items.

Gripping tools of the type indicated above are configured to make temporary contact with an object to be gripped, ensuring its position and orientation during handling. The grip is obtained by means of forces produced by gripping elements, temporarily ensuring a defined position and orientation of the object to be handled, relative to a reference system.

A typical example of use is that on a multi-axis manipulator robot, in particular, for picking up and positioning a metal item in a welding station, for assembling a motor-vehicle structure or a sub-assembly thereof.

Tools of the type indicated above that have been made up to now have a relatively complex structure requiring long and laborious preliminary calibration operations. Conversely, in the event that these preliminary operations do not have to be carried out, the tool is designed to operate only on items of a particular geometry, thus restricting the use of the tool to a certain type of items to be gripped.

OBJECT OF THE INVENTION

One object of the invention is that of producing a gripping tool having a relatively simple and light structure, which allows preliminary calibration operations to be carried out, in a particularly simple and rapid way.

An additional object of the invention is to provide a gripping tool of the type indicated above which has a modular structure that can be easily reconfigured according to the item to be handled, the assembly station and the manipulator robot used.

An additional object of the invention is to provide a gripping tool of the type indicated above that is extremely reliable in use and relatively low in cost.

SUMMARY OF THE INVENTION

In order to achieve one or more of the aforesaid objects, the invention relates to a gripping tool, usable on a manipulator device for picking up and handling items, said gripping tool comprising:
- a support frame extending along a first axis, provided with an attachment element for connecting to the manipulator device,
- a plurality of gripping devices distributed in assemblies, each assembly consisting of one or more gripping devices,
- wherein each assembly is carried by a respective auxiliary frame connected to the support frame by means of respective connecting members configured to be able to adjust the auxiliary frames and the gripping devices in position with respect to the support frame,
- wherein said respective connecting members comprise an anchoring ring attached to the support frame, so as to be adjustable in position along said first axis,
- wherein said respective connecting members further comprise an angular bracket comprising:
  a base portion coupled to a respective anchoring ring, and
  a vertical portion mounted to a respective auxiliary frame, in such a way as to be able to adjust each auxiliary frame in a given position, with respect to said vertical portion, by rotating the frame around an axis perpendicular to the plane defined by the aforesaid vertical portion of the angular bracket,
- wherein the gripping devices of each assembly are made—at least partially—by means of an additive manufacturing technology.

Additional advantageous characteristics of the invention are indicated in the attached claims, which form an integral part of the technical disclosure administered herein in relation to the invention.

The invention also relates to a method wherein, prior to the use of the tool, a preliminary calibration is performed comprising the following steps:
- adjusting the anchoring rings in position along the axis of the support frame,
- adjusting each auxiliary frame in position with respect to said vertical portion, by rotating the auxiliary frame about an axis perpendicular to the plane defined by the aforesaid vertical portion of the angular bracket, and
- adjusting each pair of connecting elements and angular brackets in position with respect to the anchoring ring, by rotating the connecting element and the bracket associated therewith, around an axis perpendicular to the axis of the support frame, passing through the plane defined by a portion of the ring on which the connecting element is mounted.

BRIEF DESCRIPTION OF THE DRAWINGS

Further characteristics and advantages of the invention will become apparent from the description that follows with reference to the attached drawings, provided purely by way of non-limiting example, wherein:

FIGS. 3A-10 are schematic perspective views on an enlarged scale illustrating various components of the tool of the previous figure.

DETAILED DESCRIPTION OF PREFERRED EMBODIMENTS

Figure 1:
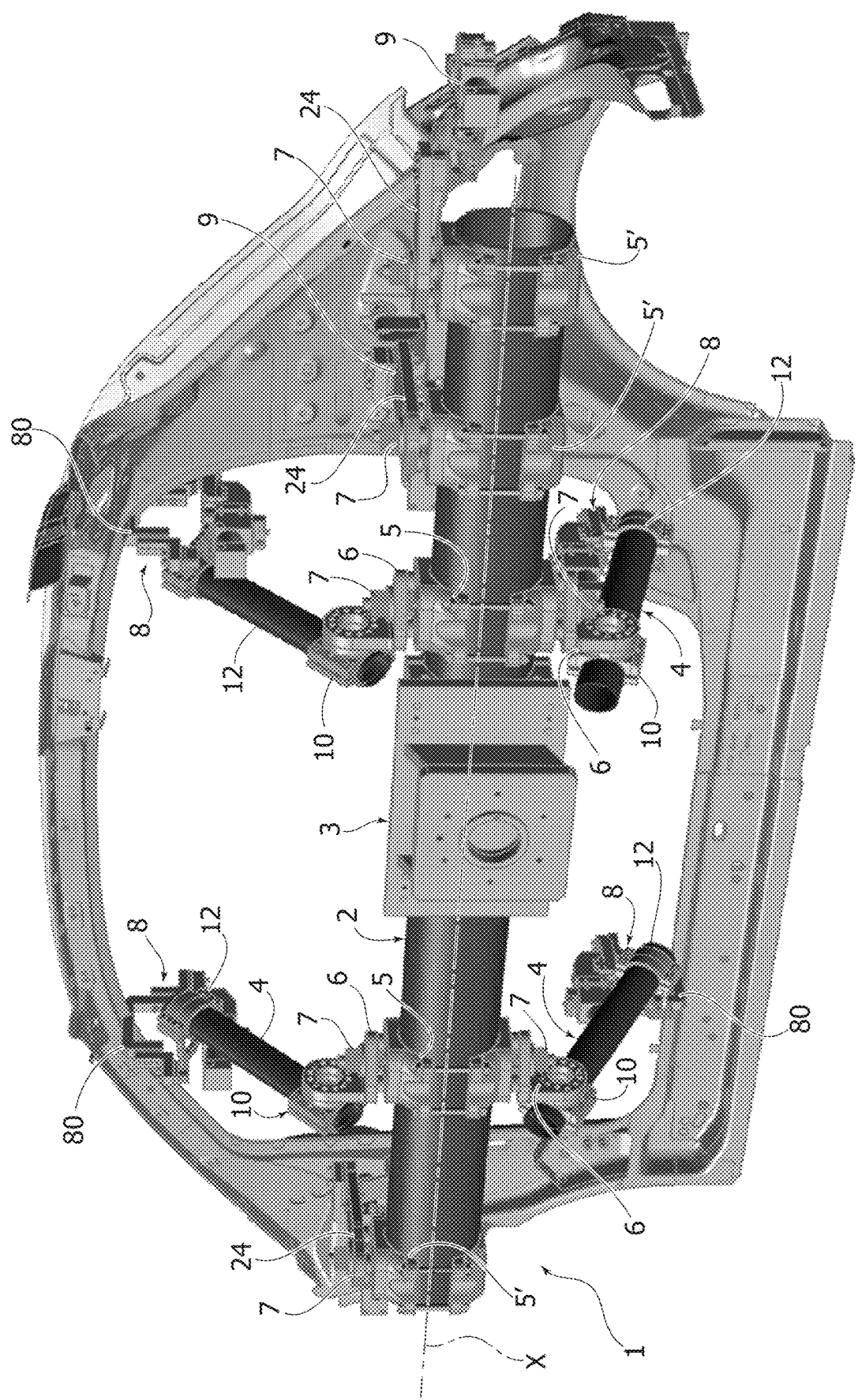
FIG. 1 is a perspective view showing a preferred embodiment of a gripping tool according to the invention, associated with a side of a motor-vehicle.
Figure 2:
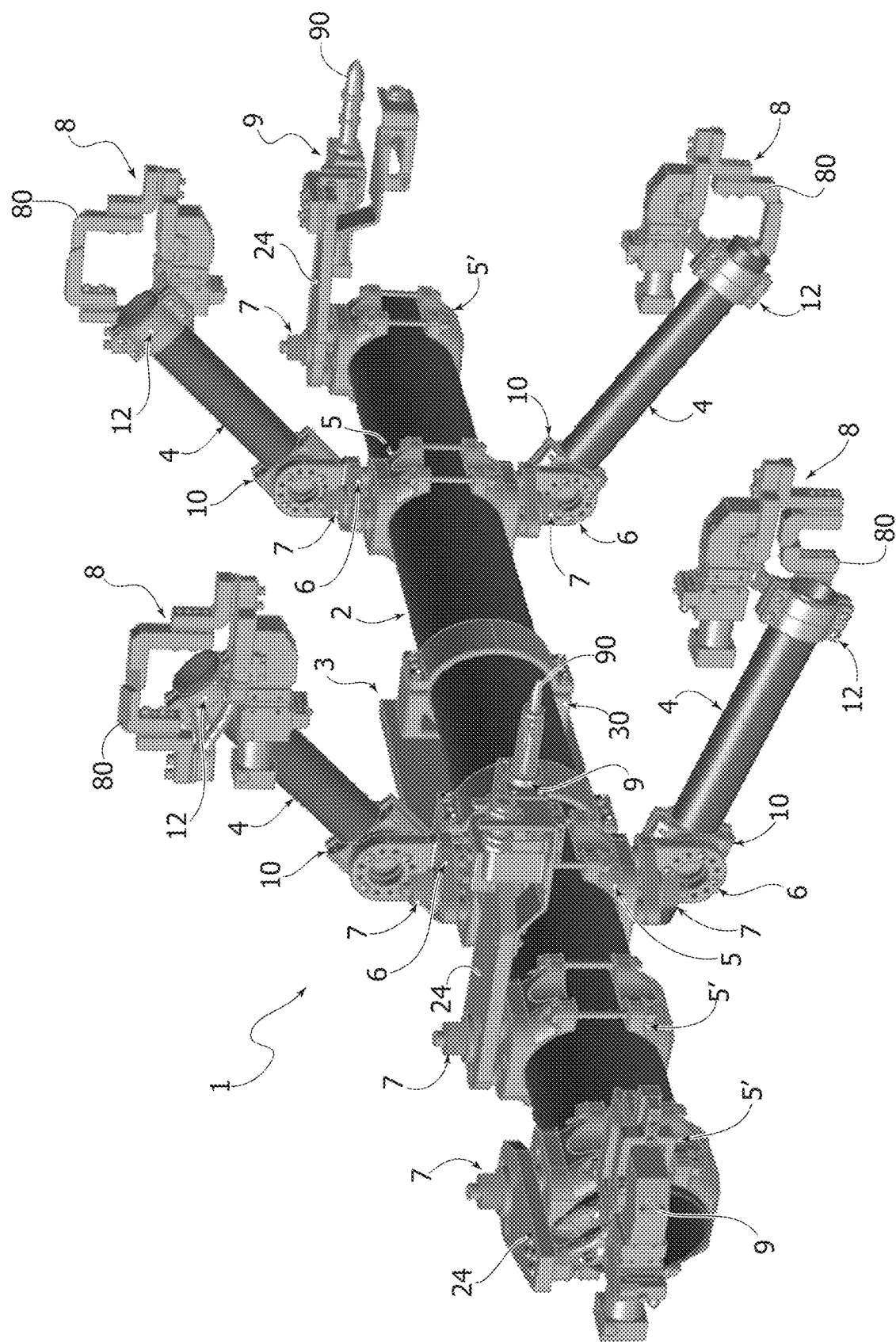
FIG. 2 is an additional perspective view of the gripping tool of the previous figure, in which the motor-vehicle side has been removed.

With reference to FIGS. 1 and 2, reference 1 indicates—in general—a gripping tool ("gripper") according to the invention, usable on a manipulator robot of any known type to pick up and position items in an assembly station.

It is evident that the tool 1 according to the invention is of general use and that—in particular—it can be used with any type of manipulating device or machine. Furthermore, the tool according to the invention can be used not only to pick up and position items in a station wherein the picked-up item must be assembled on a previously prepared item in a precise position in the station, but also to pick up and position items in any other type of industrial equipment or even just to transfer items from one station to another in a production plant. In the example illustrated in FIG. 1, the gripping tool 1 picks up a side of a motor-vehicle door.

As illustrated in FIGS. 1 and 2, the tool 1 comprises a support frame 2 provided with an attachment element 3 for connecting to a manipulator device (not illustrated in the drawings). In one or more embodiments, as well as in the one illustrated in the figures, the support frame 2 is tubular in shape, and is mainly spaced along a first axis X. Preferably, the support frame 2 is made of composite material, including a matrix, for example, a matrix of plastic material, reinforced with fibers, for example, carbon fibers. Still according to an additional preferred characteristic, the support frame 2 is a tubular member with an elliptical cross-section. The term "elliptical" means any cross-section with an oval shape having a main axis and a second minor axis of the main axis.

Thanks to these characteristics, the support frame 2 has characteristics of extreme lightness, also being relatively simple to produce and also preventing any type of undesired rotation of the components of the tool 1 constrained to the support frame 2.

In one or more embodiments, as well as in the one illustrated in FIGS. 1, 2, the attachment element 3 is a plate element with two opposite faces, wherein one of the two faces is arranged for connecting to the manipulator device. The plate element is mounted on the support frame 2 by means of an anchoring ring 30 fixed on the support frame 2. In accordance with what is illustrated in the drawings, the anchoring ring 30 has a first portion associated with the plate element, and a second portion connected to the first portion by connecting elements of any known type. Preferably, the attachment element 3 and the anchoring ring 30 are made of metal material.

According to an essential characteristic of the present invention, the gripping tool 1 comprises a plurality of gripping devices 80 distributed in assemblies 8, wherein each assembly 8 consists of one or more gripping devices 80. As illustrated in FIGS. 1, 2, each assembly 8 is carried by a respective auxiliary frame 4 connected to the support frame 2 by means of respective connecting members, which are described in detail in the following description.

In one or more embodiments, as well as in the one illustrated in FIGS. 1, 2, the auxiliary frames 4 are tubular members made in a manner substantially similar to that indicated above for the support frame 2. Therefore, according to a preferred example, each auxiliary tubular frame 4 is made of composite material and has an elliptical cross-section having smaller dimensions than those of the support frame 2.

Each auxiliary frame 4 is attached to the support frame 2 by means of an anchoring ring 5, so that the auxiliary frames 4 are spaced substantially perpendicular to the support frame 2. In one or more embodiments, as well as in the one illustrated in the drawings, each ring 5 carries a pair of auxiliary frames 4.

Figure 7:
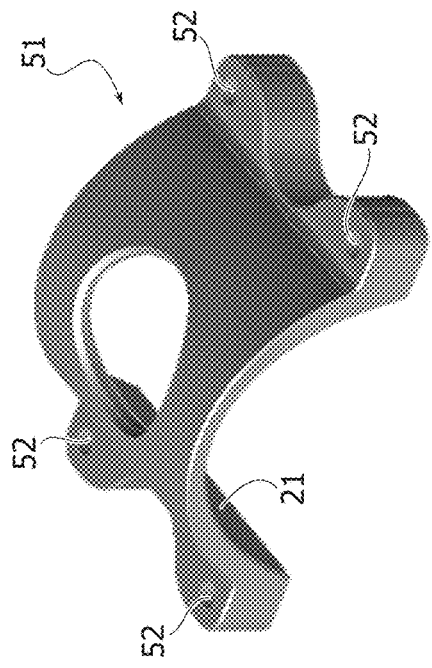

As also illustrated in the enlarged-scale exploded view of FIG. 7, each anchoring ring 5 comprises a first portion 50 and a second portion 51 rigidly connected to each other, so as to be stably mounted on the support frame 2. Preferably, the aforesaid portions 50, 51 are substantially plate-shaped elements having a respective inner face 20, 21 with a rounded shape to allow coupling to the tubular-shaped support frame 2. The connection between the portions 50, 51 is made by means of fastening elements of any known type coupled with respective holes 52 made on the portions 50, 51.

As will be further explained below, the first portion 50 has a series of cavities 11 and a central hole 13, to allow connection of the auxiliary frame 4 to the respective ring 5. In the case wherein each ring 5 carries a pair of auxiliary frames 4 (FIGS. 1, 2), the first and second portions 50, 51 are made in the same way and carry both the aforesaid cavities 11 and the aforesaid central hole 13. Conversely, in the case wherein each ring 5 carries only one auxiliary frame 4, the second portion 51 can be produced as a simple counterpart of the portion 50 (FIG. 7), so as to create a stable mounting on the support frame 2.

In accordance with an important characteristic of the invention, the rings 5 are configured to be adjustable in position along the support frame 2 (along the first axis X). It will, therefore, be appreciated that the gripping tool 1 according to the invention allows a first calibration operation to be carried out prior to use, by adjusting the anchoring rings 5 and 30 along the support frame 2 (axis X). As evident, to carry out this operation, it is necessary to remove the connecting elements that hold the portions of each ring together, and to position the rings along the frame 2 in the chosen position.

In accordance with an additional relevant characteristic of the invention, the connecting members designed to connect the auxiliary frames 4 to the support frame 2 also comprise a respective angular bracket 6 (illustrated in the enlarged scale view of FIG. 3A). Each angular bracket 6 comprises a base portion 60 coupled to a respective anchoring ring 5, and a vertical portion 61 tightened to a respective auxiliary frame 4.

In accordance with an additional characteristic of the invention, the tool 1 allows a second preliminary calibration operation. This second operation consists in adjusting, in a determined position, each auxiliary frame 4 with respect to the aforesaid vertical portion 61 of the bracket 6, by rotating the frame 4 around an axis Y perpendicular to the plane defined by the aforesaid vertical portion 61 of the angular bracket 6.

In accordance with the preferred embodiment illustrated in the drawings, the vertical portion 61 comprises a central opening 15 and a plurality of holes 14 arranged radially around the central opening 15. Each auxiliary frame 4 is tightened to the respective bracket 6 with the aid of a flange 10 (FIG. 3B) substantially arranged at one end of the respective auxiliary frame 4. Preferably, the flanges 10 are defined by two portions 18, 19 connected to each other, around the respective auxiliary frame 4. The portions 18, 19 have a respective rounded face 22, 23 to allow assembly on the respective auxiliary frame 4 of tubular shape.

As illustrated in FIGS. 3A-4B, each flange 10 is configured to perform a quick and correct centering on the vertical portion 61 of the bracket 6. To make the connection with the bracket 6 (vertical portion 61), the flange 10 comprises a central projecting portion 17, and a series of connecting holes 16 arranged radially around the central projecting portion 17. The central opening 15 of the vertical portion 61 is formed to receive the central protruding portion 17 of the connecting flange 10. Each flange 10 is connected to the respective bracket 6 by means of fastening elements 20 engaged in respective holes 14, 16, respectively aligned.

Note that the connecting holes 16 of the flange 10 are offset from that of the holes 14 of the bracket 6. Therefore, by rotating the auxiliary frame 4 around an axis Y perpendicular to the plane defined by the vertical portion 61, it is possible to define the required connecting position between the bracket 6 and the flange 10. In accordance with the preferred embodiment illustrated in FIGS. 4A, 4B, the connection is ensured by respective fastening members 20 that engage four pairs of holes 14, 16 respectively aligned with each other.

As illustrated in FIGS. 4A, 4B, it will therefore be appreciated that the tool 1 allows a second calibration operation prior to use, which can be carried out by adjusting each auxiliary frame 4 in a determined position with respect to the aforesaid vertical portion 61 of the bracket 6, by rotating the frame 4 around an axis Y perpendicular to the plane defined by the aforesaid vertical portion 61 of the angular bracket 6.

As previously indicated, the base portion 60 of a respective angular bracket 6 is coupled to a respective anchoring ring 5. The coupling can be achieved by means of a connecting element (for example, a plate-shaped element). According to a preferred characteristic of the invention, this coupling is achieved by means of a controlled failure assembly 7, which is not per se the subject of the present invention, illustrated—in particular—in the enlarged scale views of FIGS. 5, 6. The controlled failure assembly 7 is configured to ensure that, in the event of a collision, the gripping tool 1 breaks in a precise point (pin 70), favoring the subsequent repair of the components, in order to reduce the overall repair time.

In order to be able to mount the controlled failure assembly 7, a central hole 62 and a series of auxiliary holes 62 arranged radially around the central hole 62 are formed on the base portion 60 of the angular bracket 6 (FIG. 3A). Preferably, the base portion 60 is triangular in shape, on which three auxiliary holes 62 are made, each arranged at a vertex of the triangular shape.

Figure 6:
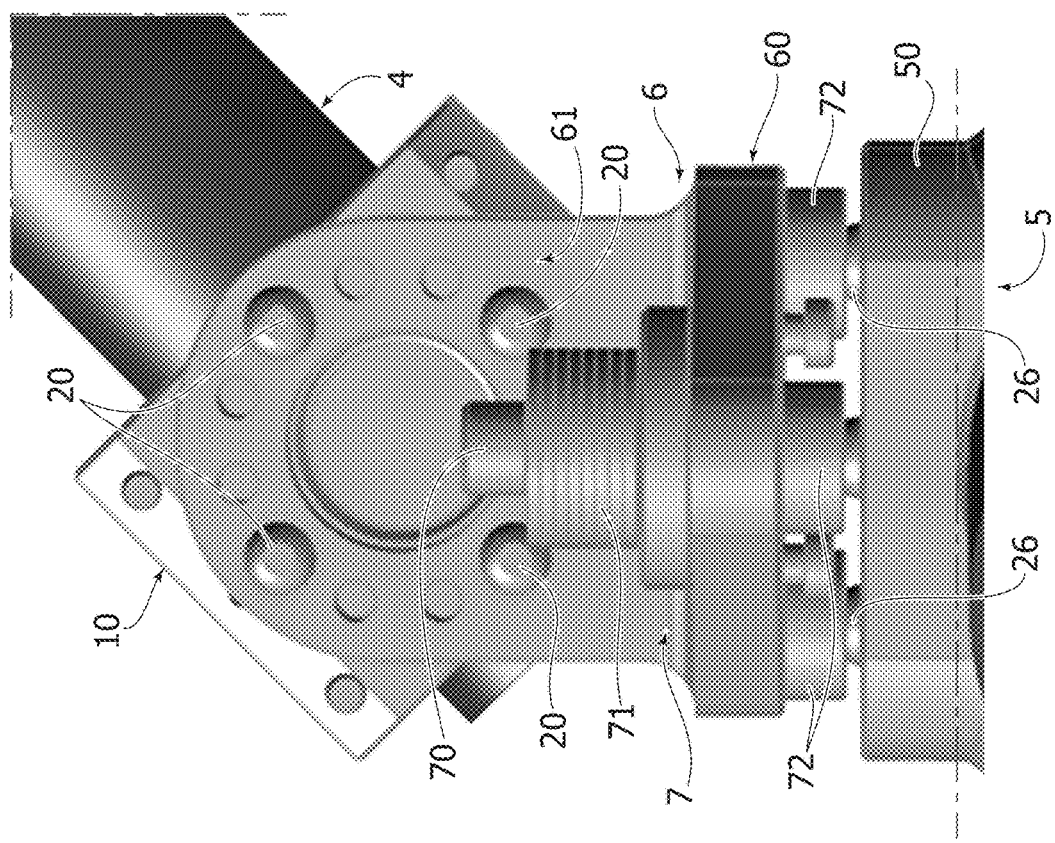
Figure 5:
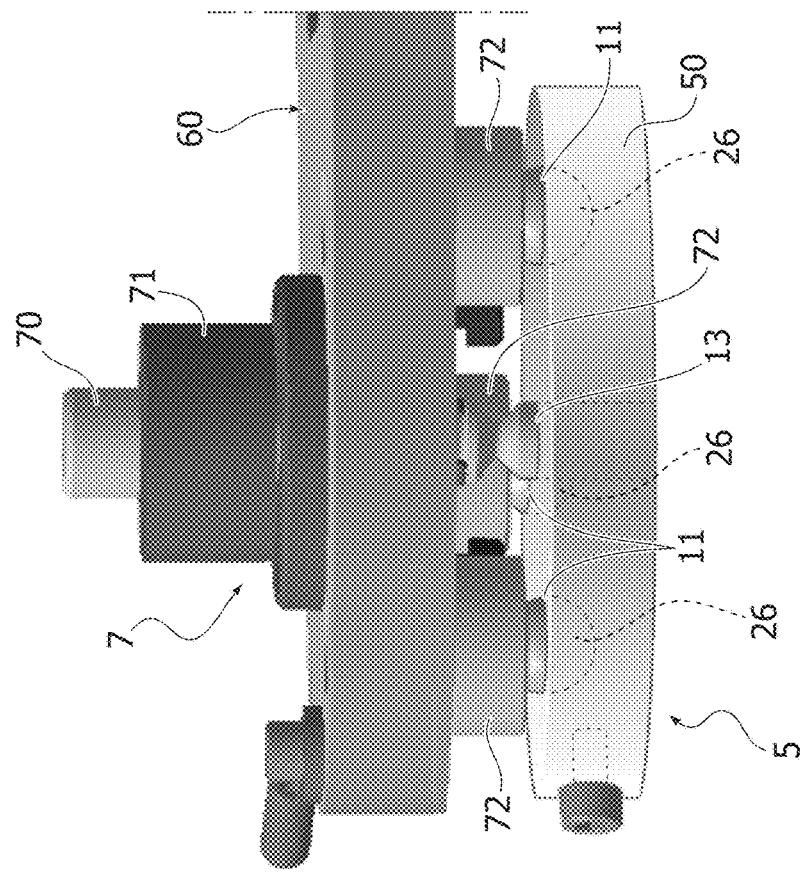

As illustrated in FIGS. 5, 6, the controlled failure assembly 7 comprises a threaded tubular pin 70 passing through the central hole 62 obtained on the base portion 60 of the bracket 6, and screwed to the main hole 13 obtained on a respective anchoring ring 5. As illustrated in FIG. 5, a part of the pin 70 protrudes from the base portion 60, in the opposite direction with respect to the ring 5. The assembly 7 also includes a threaded clamping bushing 71, axially engaged on the tubular pin 70, in particular on its part that protrudes from the base portion 60, in the opposite direction with respect to the ring 5. The bushing 71 is arranged against the base portion 60 of the angular bracket 6, and comprises an end portion coupled to the central hole 62 of the bracket 6. The assembly 7 also comprises additional fastening elements 72 arranged radially around the main axis of the pin 70 and of the bushing 71. Each fastening element 72 comprises a threaded part at a first end, engaged with the holes 63 of the angular bracket 6 and a ball connecting element 26 at a second end, engaged within one of the spherical cavities 11 obtained on a respective anchoring ring 5.

According to an additional characteristic of the invention, each controlled failure assembly 7 can be mounted to an anchoring ring 5, so as to be adjustable in position, with respect to the anchoring ring. This adjustment can be made by rotating the assembly 7 (and the bracket 6 associated therewith) around an axis perpendicular to the axis X of the frame 2, passing through the plane defined by the portion of the ring 5 on which the assembly 7 is mounted. To produce the assembly, each hole 63 of the angular bracket 6 must be axially aligned with a respective spherical cavity 11. It will, therefore, be appreciated that the gripping tool 1 according to the invention allows an additional calibration operation to be carried out prior to use, by adjusting the assembly 7 and the bracket 6, around an axis perpendicular to the axis X of the frame 2, passing through the plane defined by the ring portion 5 on which the assembly 7 is mounted.

Figure 8A:
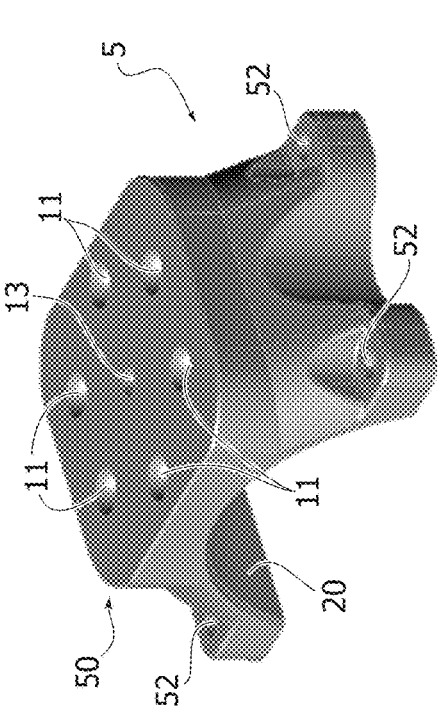
Figure 8A:
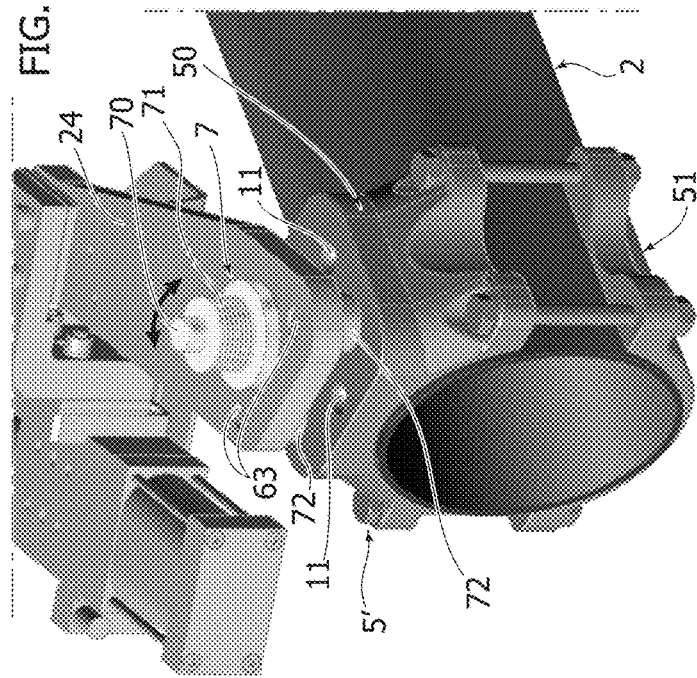

As illustrated in the perspective view of FIGS. 1, 2, the gripping tool 1 may comprise, in addition to the gripping devices 80, further devices 9 designed to perform additional functions with respect to those performed by the gripping devices 80. In one or more embodiments, as well as in the one illustrated in the drawings, these further devices 9 comprise a reference pin 90, useful for referring the item into position during the picking-up and handling step carried out by the gripping devices 80. (These devices 9 are arranged at a terminal end of a respective frame 24, in turn connected to a respective anchoring ring 5'. The anchoring rings 5' are made in a manner similar to that previously described for the rings 5 connected to the auxiliary frames 4. The connection between each ring 5' and the respective frame 24 is made by means of a controlled failure assembly 7. In a preferred example, the frame 24 is a beam-shaped element that extends substantially transversely to the support frame 2. In this case, as illustrated in FIGS. 8A, the end portion of the frame 24 has a series of holes and a central opening (similar to that provided on the base portions 60 of the brackets 6) to create the connection with the assembly 7. Therefore, in this case, the assembly 7 connects the frame 24 to the ring 5', without the aid of the previously described angular bracket 6.

Figure 8B:
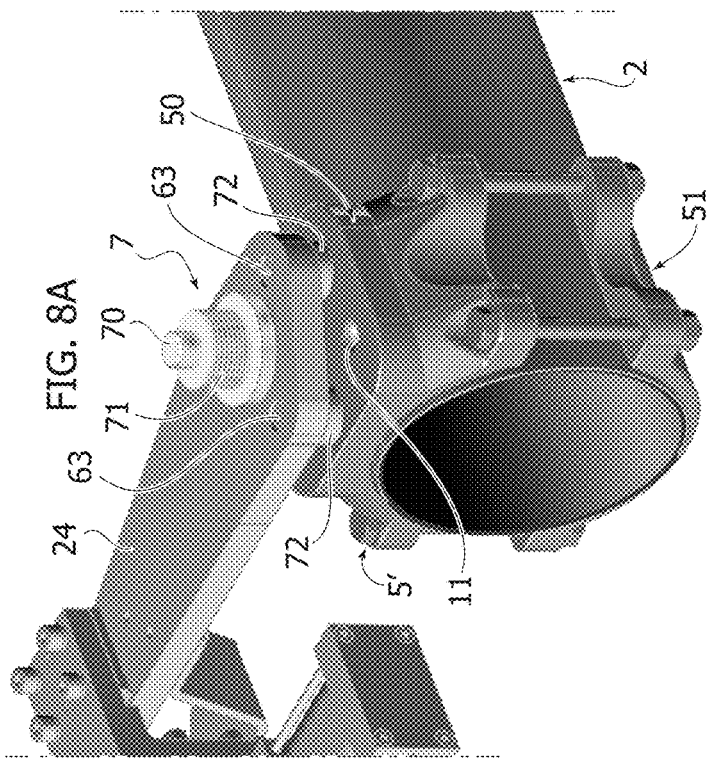

FIGS. 8A, 8B illustrate an additional calibration operation, which can be carried out prior to use, wherein the assembly 7 and the respective frame 24 can be mounted in an adjustable position, by rotating the assembly 7 and the frame 24 around an axis perpendicular to the axis X of the frame 2, passing through the plane defined by the portion of the ring 5' on which the assembly 7 is mounted.

Figure 10:
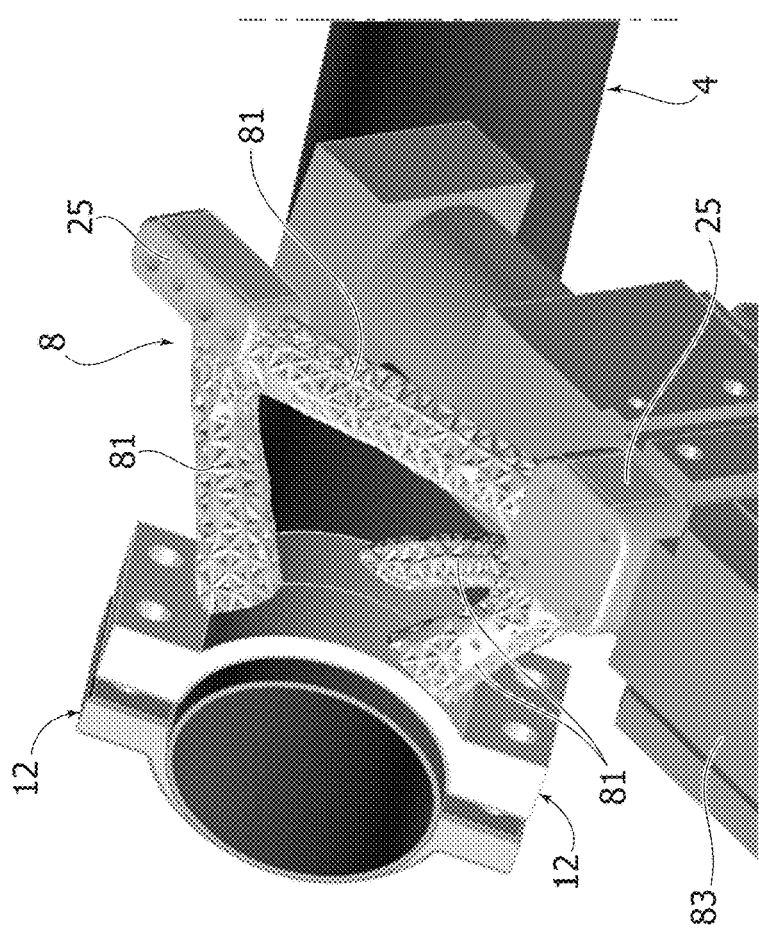
Figure 9:
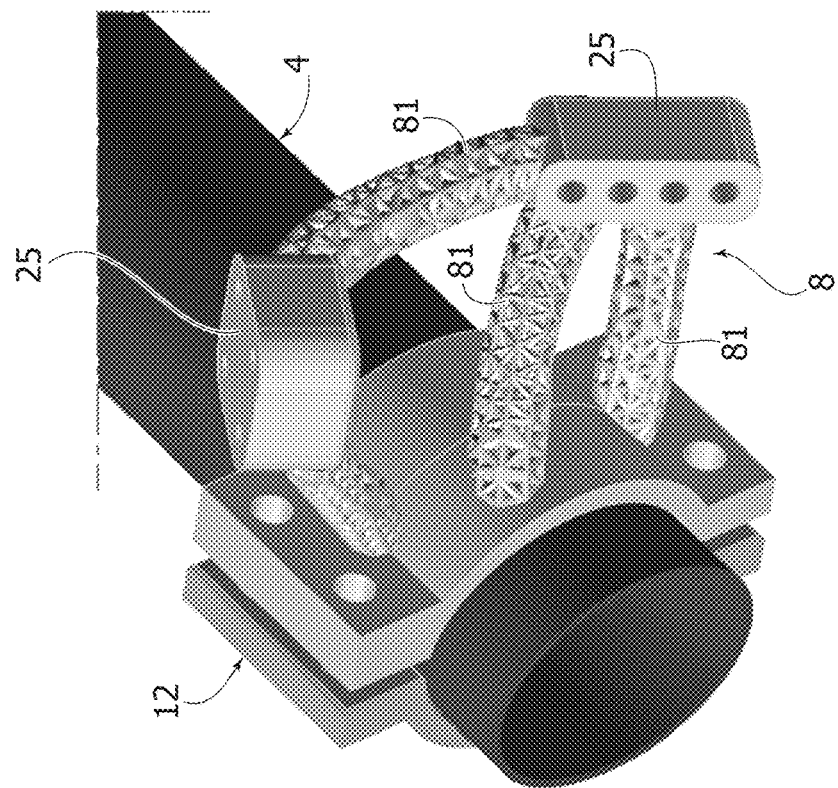

FIGS. 9, 10 are enlarged-scale views illustrating preferred embodiments of the gripping devices 80. According to an important characteristic of the invention, the gripping devices 80 of each assembly 8 are made at least partially by means of an additive manufacturing technology.

The technology of "additive manufacturing" has also been used for some time. It makes use of an energy source, such as, for example, a laser beam, to melt layers of powders of synthetic material or metal material in such a way as to form—layer by layer—a component with a required configuration. A machine for producing metal components by means of "additive manufacturing" technology is, for example, described and illustrated in document WO2015/181772 A1.

Each assembly 8 comprises a plurality of arms 81 on which at least one connecting block 25 is mounted for connecting support devices 83 arranged to support the gripping devices 80 (shaped, for example, as grippers), made to grip the sheet metal items. The aforesaid plurality of arms 81 of each assembly 8 extends from a connecting flange 12 connected to a terminal end of a respective auxiliary frame 4.

According to a characteristic of the invention, for each assembly 8, the aforesaid plurality of arms 81 and the connecting blocks 25 are a monolithic assembly made by means of an additive manufacturing technology, while the connecting flange 12 is made, for example, of metal material by means of traditional molding technologies.

The arrangement and number of the arms 81 may vary between the assemblies 8, so that the arms 81 of each assembly 8 are suitably configured to support a certain gripping member and/or in relation to the position with respect to the item to be gripped and/or the shape and weight of the item to be gripped.

By means of the aforesaid additive manufacturing technology, the arms 81 are suitably made quickly, diversifying each assembly 8, according to the envisaged needs. Therefore, the gripping tool 1 is easily reconfigurable, by modifying the arms 81 in a simple and rapid way to meet the necessary requirements of strength, rigidity and reliability. Furthermore, this advantage of being able to reconfigure the gripping tool according to the production needs is further increased thanks to the possibility of being able to carry out the preliminary calibration operations indicated above.

Of course, without prejudice to the principle of the invention, the embodiments and construction details may widely vary with respect to those described and illustrated by way of example, without thereby departing from the scope of the present invention, as defined in the attached claims.

What is claimed is:

1. A gripping tool, usable on a manipulator device for picking up and handling items, said gripping tool comprising:
    a support frame extending along a first axis, provided with an attachment element for connecting to the manipulator device,
    a plurality of gripping devices distributed in assemblies, each assembly including one or more gripping devices,
    wherein each assembly is carried by a respective auxiliary frame connected to the support frame by means of respective connecting members configured for adjusting the auxiliary frames and the gripping devices in position with respect to the support frame,
    wherein said respective connecting members comprise an anchoring ring attached to the support frame, so as to be adjustable in position along said first axis,
    wherein said respective connecting members also comprise an angular bracket comprising:
        a base portion coupled to a respective anchoring ring, by means of a connecting element, and a vertical portion mounted to a respective auxiliary frame, in such a way as to allow for adjusting each auxiliary frame in a given position with respect to said vertical portion, by rotating the auxiliary frame around an axis perpendicular to a plane defined by the vertical portion of the angular bracket, and
    wherein the gripping devices of each assembly are made at least partially by means of an additive manufacturing technology.

2. The gripping tool according to claim 1, wherein each set of connecting elements and angular brackets associated with respective connecting members is adjustable in position with respect to the anchoring ring, by rotating the connecting element and the bracket associated therewith, around an axis perpendicular to the first axis of the frame, passing through a plane defined by a portion of the ring on which said connecting element is mounted.

3. The gripping tool according to claim 1, wherein said support frame is a tubular member with an elliptical cross-section, made of composite material, including a matrix.

4. The gripping tool according to claim 3, wherein the matrix comprises a matrix of plastic material, reinforced with fibers, including carbon fibers.

5. The gripping tool according to claim 1, wherein the gripping devices of each assembly comprise a plurality of arms on which at least one connecting block is mounted for connecting support devices arranged to support the gripping devices, said plurality of arms of each assembly extending from a connecting flange connected to a terminal end of a respective auxiliary frame.

6. The gripping tool according to claim 5, wherein said plurality of arms and said at least one connecting block are made by means of an additive manufacturing technology.

7. The gripping tool according to claim 1, wherein said auxiliary frames are tubular members made of composite material, having an elliptical-shaped cross-section.

8. The gripping tool according to claim 1, wherein each anchoring ring carries a pair of auxiliary frames.

9. The gripping tool according to claim 1, wherein each anchoring ring comprises a first portion and a second portion rigidly connected to each other, and wherein at least the first portion has a series of cavities and a central hole, to allow connection of the respective auxiliary frame by means of said connecting element.

10. A method for using a gripping tool according to claim 1, wherein the gripping tool is associated with a manipulator device, and is used to pick up an item and to position it in a correct assembly position above a fixed apparatus of an assembly station, wherein, prior to the use of the tool, a preliminary calibration is performed comprising the following steps:
    adjusting the anchoring rings in position along the first axis of the support frame,
    adjusting each auxiliary frame in position with respect to said vertical portion, by rotating the auxiliary frame about an axis perpendicular to the plane defined by said vertical portion of the angular bracket, and
    adjusting each set of connecting elements and angular brackets associated with respective connecting members in position with respect to the anchoring ring, by rotating the connecting element and the angular bracket associated therewith around an axis perpendicular to the first axis of the support frame, passing through a plane defined by a portion of the ring on which the connecting element is mounted.

* * * * *